(No Model.) 2 Sheets—Sheet 1.
J. C. LOVE.
CONDUIT FOR ELECTRIC RAILWAYS.
No. 532,165. Patented Jan. 8, 1895.
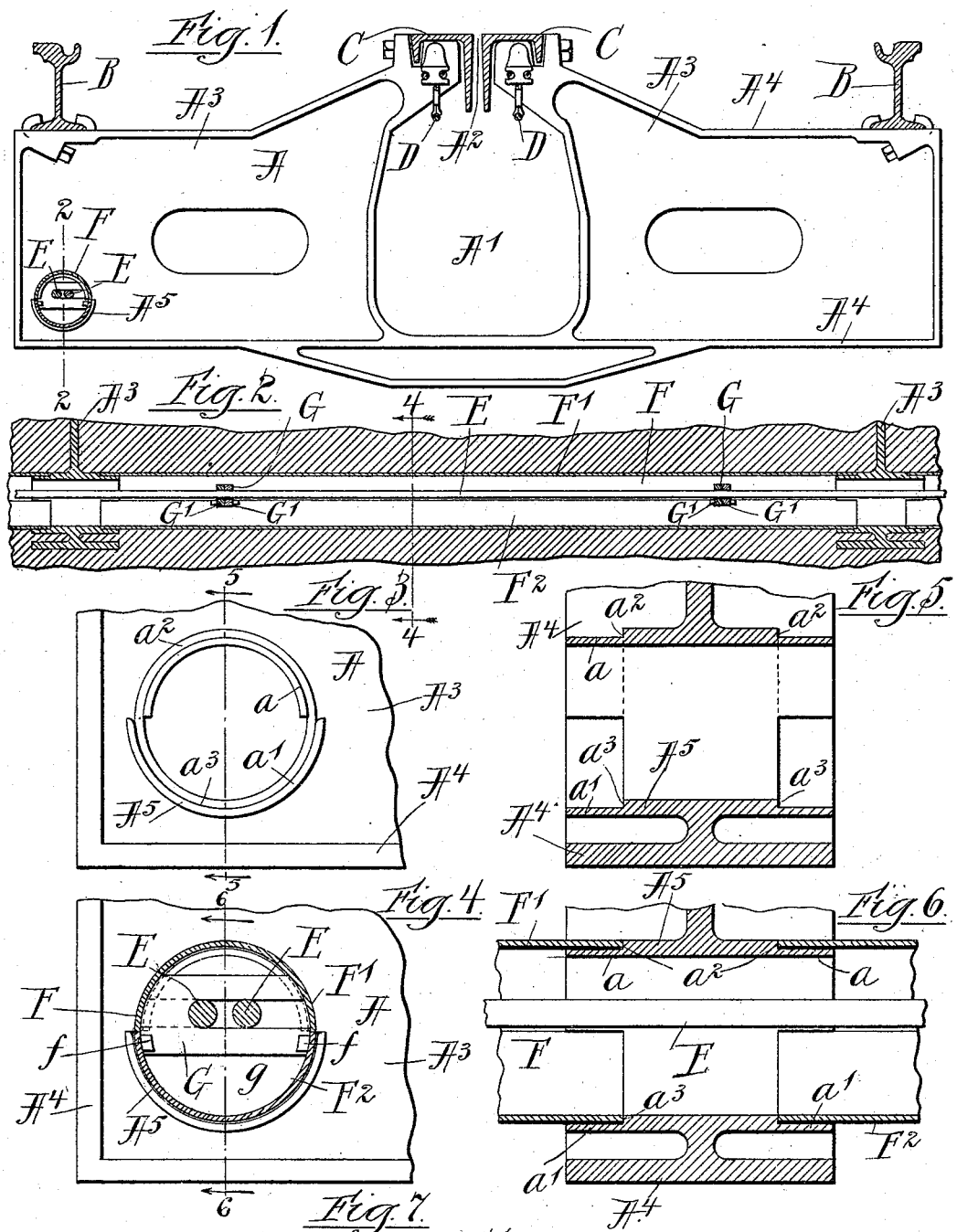
Witnesses:
Wm. F. Henning
Jno. W. Adams
Inventor:
John C. Love
by Dayton, Poole & Brown his Attys (No Model.) 2 Sheets—Sheet 2.

J. C. LOVE.
CONDUIT FOR ELECTRIC RAILWAYS.

No. 532,165. Patented Jan. 8, 1895.

Witnesses:
Jno. W. Adams
D. V. Cowl

Inventor:-
John C. Love.
by:- Dayton, Poole & Brown
his Attorneys

United States Patent Office.

JOHN C. LOVE, OF CHICAGO, ILLINOIS, ASSIGNOR, BY DIRECT AND MESNE ASSIGNMENTS, TO THE LOVE ELECTRIC TRACTION COMPANY, OF SAME PLACE.

CONDUIT FOR ELECTRIC RAILWAYS.

SPECIFICATION forming part of Letters Patent No. 532,165, dated January 8, 1895.

Application filed May 9, 1894. Serial No. 510,653. (No model.)

*To all whom it may concern:*

Be it known that I, JOHN C. LOVE, of Chicago, in the county of Cook and State of Illinois, have invented certain new and useful Improvements in Conduits for Electric Railways; and I do hereby declare that the following is a full, clear, and exact description thereof, reference being had to the accompanying drawings, and to the letters of reference marked thereon, which form a part of this specification.

This invention relates to improvements in underground conduits for electric railways, and more particularly to the provision in connection with a slotted conduit which contains the line conductors, and through which pass the traveling contact devices on the car, of a supplementary pipe or conduit for the feed wires which are connected at intervals with the line wires or conductors of the railway, and by means of which the current is supplied to the latter.

The object of the invention is to provide an improved construction in devices of the character referred to; and it consists in the matters hereinafter set forth, and particularly pointed out in the appended claims.

Figure 8:
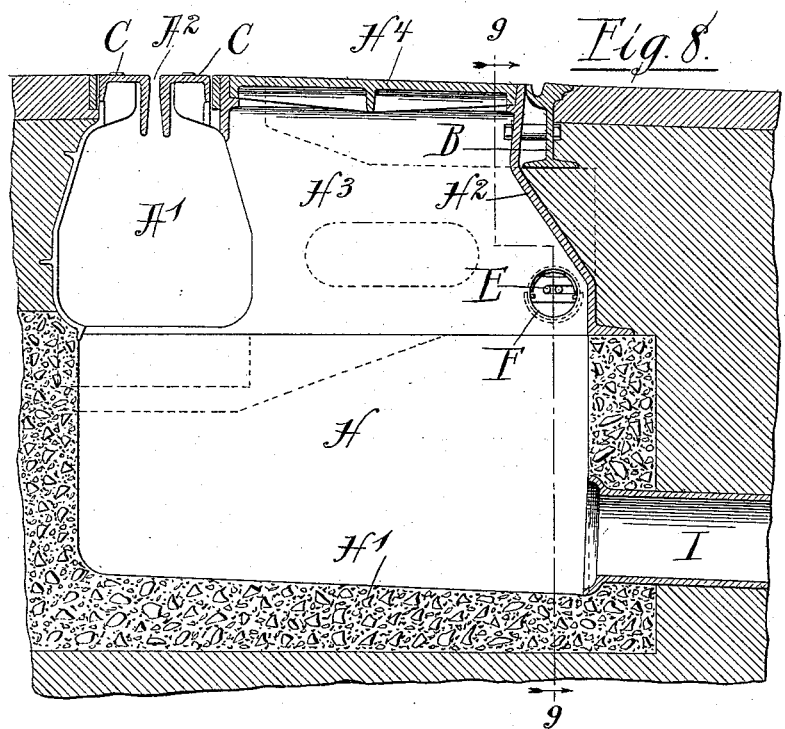
Figure 9:
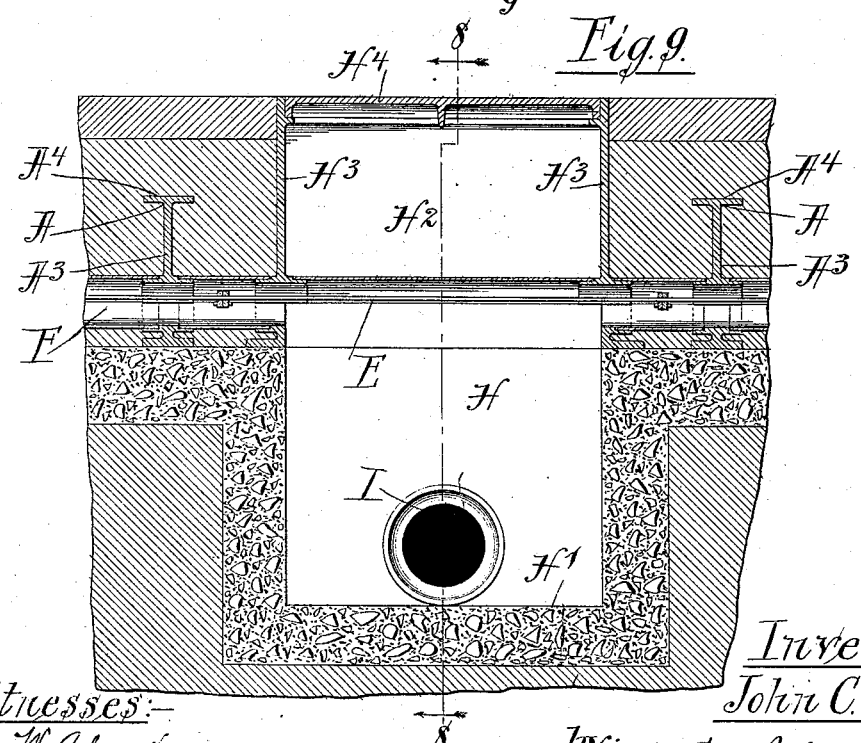

In the accompanying drawings, Figure 1 is a transverse section of an underground conduit embodying my invention in one form. Fig. 2 is a longitudinal section on line 2—2 of Fig. 1 of the feed wire pipe or conduit. Fig. 3 is an enlarged detail end view of the integral sleeve in the yokes forming a part of the supplementary conduit. Fig. 4 is a transverse sectional detail, taken on line 4—4 of Fig. 2. Fig. 5 is a longitudinal sectional detail, taken on line 5—5 of Fig. 3. Fig. 6 is a similar view, taken on line 6—6 of Fig. 4. Fig. 7 is a detail view of an insulating clip for supporting the feed wires within their conduit pipe. Fig. 8 is a transvere section on line 8—8 of Fig. 9, showing the construction of the conduit pipe where it passes through a man-hole. Fig. 9 is a longitudinal section on line 9—9 of Fig. 8.

In said drawings A designates a transversely arranged conduit yoke adapted to support at its ends the bearing rails B, and formed at its center with the usual conduit opening A', at the top of which a continuous slot $A^2$ is provided between slot rails C rigidly bolted to the yokes.

D D designate the line wires or conductors supported within the conduit by suitable insulators, and furnish the current to traveling contact devices carried by a supporting bar or arm which extends into the conduit from the motor car through the slot $A^2$, in a familar manner. Said yoke A comprises a vertical web $A^3$ and marginal flanges $A^4$, and is herein shown as substantially similar to the yoke illustrated in my pending application, Serial No. 484,827, filed September 5, 1893, but any similar yoke possessing the same general features may be equally well provided with my present improvements.

E E designate the usual feeder wires which are connected at suitable intervals with the line conductors D. Said feeder wires E are herein shown as located in a separate or supplementary conduit or pipe F, which in this instance passes through the webs $A^3$ of each yoke near one of the lower outer courses thereof, such location enabling them to be gotten at without disturbing the mass or bed of concrete which will ordinarily be located along the main conduit A'. Said conduit pipe F is composed of upper and lower semicylindric pipe sections F' and $F^2$ made of suitable lengths to extend between two adjacent yokes, and adapted to detachably engage short tubular sections $A^5$ extending at opposite sides of the vertical webs A' of the yokes, and cast integral with said webs. As an approved means of detachably connecting the sections F' and $F^2$ of the pipe with the sections $A^5$, the latter are formed at their ends with curved upper and lower flanges $a$ and $a'$, of which the outer surface of the upper flange $a$ and the inner surface of the lower flange $a'$ are curved concentrically on a radius substantially equal to the exterior radius of the pipe sections.

The upper pipe section F' rests at its ends upon the exterior of the upper curved flange $a$, and the lower pipe section $F^2$ rests at its ends within the lower flanges $a'$. The lower section is placed in position before the upper section by first resting its ends upon the upper flanges $a$ and then rolling or turning it axially upon said flanges, such movement obviously causing the ends of the section to pass edge-wise between the adjoining margins of the flanges, and within the lower flange. When the upper section is thus rolled or twisted into place the latter is placed in position with its ends engaging the upper flanges $a$, as stated, and with its side margins joining the side margins of the lower section, thus forming a continuous and completely closed pipe or conduit. In this instance the flanges $a$ and $a'$ are each made of semi-cylindric form and terminate at their side edges in a horizontal plane passing through the horizontal axes of the tubular sections of the yoke and pipe. Shoulders $a^2$ and $a^3$, respectively, are also formed at the inner ends of said flanges $a$ and $a'$ so as to abut against the ends of the pipe sections and thereby hold the same from endwise movement.

The feeder wires E are suspended within the conduit pipe F by means of insulators G G located at sufficiently frequent intervals to support the wires free from contact with the walls of the conduit pipe. As herein shown, two insulators are provided for each length of pipe, i. e., between each pair of adjacent yokes, one being located near each end of the sections $F'$ $F^2$. Various forms of insulator may be used for this purpose, but as a further improvement and as a simple and convenient construction, in an insulator for the purpose stated, I have herein shown each insulator as formed by two similar blocks $G'$ of non-conducting or insulating material, curved at their ends to fit closely within the pipe F, and each provided with an open ended horizontal slot $g'$ extending from one end of the block into the latter somewhat more than half the length of the block. The two blocks forming each insulator are slipped over the feeder wires from opposite sides of the same before the upper pipe section $F'$ is put in place, and are placed side by side within the lower section $F^2$. Short lugs $f$ are herein shown as formed or secured on the inner surface of said section in position to engage the remote faces of the two blocks and to thereby hold the same together and against movement within the pipe longitudinally of the latter. After the insulators are thus inserted the upper section $F'$ of the pipe is put in place and engages the upper portion of the curved ends of the blocks.

Preferably, and as herein shown, the blocks $G'$ are so shaped as to maintain the slots $g$ somewhat above the center of the pipe F, thereby permitting the wires E to sag more than half the diameter of said pipe before a contact will occur between the wires and the bottom of the pipe. Normally, however, the sag between the adjacent insulators will be very slight. The vertical width of the blocks $G'$ need only be enough to prevent them from being easily broken in handling, and is herein shown somewhat less than half their length. The space thus left above and below the insulators is ample to permit of a circulation of dry air being maintained within the conduit, if desired, and to permit any accumulated moisture to be drained off through convenient drain pipes, not shown.

Obviously it is not imperative that the ends of the blocks G accurately curve to fit the interior of the pipe F, since any configuration thereof which will provide sufficient points of engagement between the blocks and pipe to maintain the former in proper position will suffice for many purposes. On the other hand, it may sometimes be found desirable to make said blocks in the form of either apertured or imperforate disks of suitable size to fit within the pipe F. Such changes, however, would involve no departure from the spirit of my invention as hereinbefore set forth. Obviously also, insulators of the type herein illustrated may be useful in connection with conduit pipes which have no connection with the yokes of an electric railway conduit, and with conduit pipes constructed otherwise than as herein described.

The conduit yoke is made of such length as to extend at its ends outwardly beyond the rails, and the tubular sections $A^5$ are located directly beneath the rail-seat at one end of the yoke so that the conduit extends vertically beneath one of the rails. The principal object of this construction is to so locate the conduit that the latter will not pass through or occupy available space within the man-holes of the road which latter are provided at intervals, to afford access to the main conduit. In order, however, that the auxiliary conduits may be easily drained and access had to the wires therein, said auxiliary conduits are arranged to open into the man-holes which latter will be provided with the usual drain pipes leading to a sewer so that special drain pipes for the auxiliary conduits will not be required. A construction of this kind is illustrated in Figs. 8 and 9 of the drawings. As shown in these figures, H indicates a man-hole the lower part of which is formed by concrete walls $H'$ and the upper part by a metal casting, consisting of an outer wall $H^2$ and side walls $H^3$ $H^3$. The man-hole is provided with the usual hatch or cover $H^4$. The outer wall $H^2$ of the man-hole is in this instance bent or deflected outwardly beneath the rail so as to extend outside of the line of the auxiliary conduit, so that the latter will extend through the man-hole adjacent to its outer wall. Within the man-hole, however, the lower part or section of the conduit is omitted so as to form an opening through which water may drain from the conduit into the man-hole, and by which access may be had to the wires within the conduit. The top section of the conduit being continuous protects the wires therein from dirt and water which may drip from the top of the man-hole and at the same time prevents accidental contact with the wires of workmen who may be within the man-hole. A drain pipe I leading from the man-hole in the usual manner affords a means by which water which may accumulate therein from the main and auxiliary conduits will be drained into an adjacent sewer.

I claim as my invention—

1. The combination with the yokes of an underground slotted conduit of a supplementary conduit pipe comprising integral tubular sections on the yokes, and pipe sections extending between the yokes and supported by engagement with the ends of said tubular sections; said pipe sections and tubular sections together constituting the supplementary conduit pipe, substantially as described.

2. The combination with the yokes of an underground slotted conduit of a supplementary conduit pipe comprising integral tubular sections on the yokes, and longitudinally divided pipe sections engaging the said sleeves, substantially as described.

3. The combination with the yokes of an underground slotted conduit of a supplementary conduit pipe comprising integral tubular sections on the yokes provided at their outer ends with upper and lower curved flanges, and semi-cylindric upper and lower pipe sections resting at their ends respectively upon the upper flange and within the lower flange, substantially as described.

4. An insulator for supporting an electric conductor within a conduit pipe, comprising a plurality of similar blocks of non-conducting material provided with oppositely arranged open ended slots, adapted, when the blocks are oppositely placed within the pipe, to form an aperture for the passage of the conductor, substantially as described.

5. The combination with a conduit pipe consisting of upper and lower longitudinally divided sections, of an insulator for supporting an electric conductor within the pipe, comprising a plurality of similar non-conducting blocks provided with oppositely arranged open ended slots, and adapted at their ends to engage the opposite sides of the pipe, and lugs projecting from the inner surface of the lower section to engage the outer faces of the blocks, and to thereby hold the same together and against displacement, substantially as described.

6. The combination with the track rails and a slotted conduit of yokes which extend outwardly to support the track rails and are provided with integral tubular sections located below the rail seats and pipe sections extending between the yokes and supported by engagement with the ends of said tubular sections; said pipe sections and tubular sections together constituting the supplementary conduit pipe, substantially as described.

7. The combination of track rails, a slotted conduit and a man-hole, of yokes for supporting the rails, provided with integral tubular sections located below the rail seat and pipe sections engaged at their ends with said tubular sections and passing through the man-hole, said pipe sections being provided with openings within the man-hole, substantially as described.

In testimony that I claim the foregoing as my invention I affix my signature in presence of two witnesses.

JOHN C. LOVE.

Witnesses:
C. CLARENCE POOLE,
W. S. HALL.